US007562453B1

(12) United States Patent
Benner et al.

(10) Patent No.: US 7,562,453 B1
(45) Date of Patent: Jul. 21, 2009

(54) CONFINEMENT FENCE STRUCTURE FOR CLIMBING ANIMALS AND ITS ASSOCIATED METHODS OF CONSTRUCTION AND INSTALLATION

(76) Inventors: David Alan Benner, RD3 Box 3170, Honesdale, PA (US) 18431; Matthew Hough, 201 Fayette St., Conshohocken, PA (US) 19428

( * ) Notice: Subject to any disclaimer, the term of this patent is extended or adjusted under 35 U.S.C. 154(b) by 475 days.

(21) Appl. No.: 11/438,448

(22) Filed: May 20, 2006

Related U.S. Application Data

(63) Continuation-in-part of application No. 10/820,207, filed on Apr. 8, 2004, now abandoned.

(51) Int. Cl.
*B23P 15/12* (2006.01)
(52) U.S. Cl. .................. 29/897.31; 29/252.01; 256/1; 256/11
(58) Field of Classification Search ............ 29/897.31, 29/897.32, 525.01, 428; 256/1, 11, 12; D25/38
See application file for complete search history.

(56) References Cited

U.S. PATENT DOCUMENTS

| | | | | |
|---|---|---|---|---|
| 257,847 A * | 5/1882 | Cheney | ............................ | 256/1 |
| 903,258 A * | 11/1908 | Woodson | ....................... | 256/11 |
| 2,015,615 A | 9/1935 | Caplinger | ..................... | 256/11 |
| 2,161,944 A * | 6/1939 | Bauer | ............................ | 256/11 |
| 3,806,095 A * | 4/1974 | Ford | .............................. | 256/11 |
| 4,301,996 A * | 11/1981 | Holyoak | ......................... | 256/1 |
| 4,366,949 A * | 1/1983 | Staub, Sr. | ....................... | 256/1 |
| 4,673,166 A * | 6/1987 | MacDougall | ................. | 256/11 |
| 5,143,354 A * | 9/1992 | Nolan | ........................... | 256/12 |
| 5,267,724 A | 12/1993 | Heath et al. | .................... | 256/11 |
| 6,113,076 A * | 9/2000 | Hancock-Bogese et al. | .... | 256/1 |
| 6,199,831 B1 * | 3/2001 | Patrick et al. | ................... | 256/11 |
| 6,206,347 B1 * | 3/2001 | Kelley | ........................... | 256/47 |

* cited by examiner

*Primary Examiner*—David P Bryant
*Assistant Examiner*—Christopher M Koehler
(74) *Attorney, Agent, or Firm*—LaMorte & Associates

(57) ABSTRACT

A fencing system for confining climbing animals. The fencing system uses a plurality of vertical posts that are set in place along a fence line. Arch support brackets are provided that attach to the vertical posts. Each arch support bracket has an ascending section that climbs to an apex point and a descending section that descends from that apex point. Flexible plastic netting is suspended between the rigid supports that are created by the vertical posts and the arch support brackets. Flexible plastic netting is supported vertically by the vertical posts. Above the vertical posts, the flexible plastic netting is supported in an ascending angle to an apex point by each ascending section of the arch support brackets. From the apex point, the flexible plastic netting is supported in a descending angle to the free end of the arch support bracket.

17 Claims, 6 Drawing Sheets

CONFINEMENT FENCE STRUCTURE FOR CLIMBING ANIMALS AND ITS ASSOCIATED METHODS OF CONSTRUCTION AND INSTALLATION

RELATED APPLICATIONS

This application is a continuation-in-part of U.S. patent application Ser. No. 10/820,207, filed Apr. 8, 2004 now abandoned.

BACKGROUND OF THE INVENTION

1. Field of the Invention

In general, the present invention relates to fence structures for confining animals. More particularly, the present invention relates to fence structures with features that prevent climbing animals, such as cats, from climbing over the fence structure.

2. Description of the Related Art

Many households have pets. In the United States, two of the most common household pets are dogs and cats. No two pets have the same personalities. Some pets can be trained to live outside and not wanderers away from a home or near a street. Other pets are wanderers and will readily get lost if they are left outside and unrestrained.

Dogs are poor climbers, thus any fence that a dog cannot jump over or dig under is typically sufficient to contain a dog within a confined area. However, cats are natural climbers. They also are very adept at leaping. Thus, in order to confine a cat within fenced area, either a fence has to be constructed that is abnormally high, or some feature has to be added to the fence that deters a cat from climbing over the fence.

In the prior art, there are different types of fences that contain some feature that is intended to prevent the fence from being climbed. Many fences, especially barbed wire fences, have extra runs of barbed wire at the top of the fence to deter people from climbing the fence. Such barbed wire fences are exemplified by U.S. Pat. No. 2,015,615 to Caplinger, entitled Fence Guard. However, very few people want to have barbed-wire fences in their backyards to confine their pets. Thus, features have been added to more conventional types of backyard fences that deter the fences from being climbed.

U.S. Pat. No. 6,199,831 to Patrick, entitled Non-Electric Perimeter Fence, discloses a fence structure where angled solid panels are attached to the top of a chain link fence. The supports for the fence must be significant to support the weight of the angled panels and the wind loads experience by the angled panels. Furthermore, a lot of material is needed to create the angled solid panels. As such, the entire fence assembly is expensive to manufacture and difficult to install. Additionally, the angled solid panels are disposed at the top of the fence. As a consequence, the entire fence assembly is highly visible and blocks the view of whatever may lie beyond the fence.

U.S. Pat. No. 5,267,724 to Heath, entitled Fencing Apparatus For Containing Cats, discloses a wire shelf that can be attached to the back of an existing wooden fence. The wire shelf extends horizontally from the fence and therefore acts as a physical barrier to any cat climbing up the fence. However, in order for the Heath fence barrier to be used, a solid wooded fence must first be constructed around the periphery of the area in which the cat is to be confined. Building a solid wood fence is both expensive and obtrusive in that the wooden fence is a physical barrier that blocks the view of what lay behind the fence.

A need therefore exists in the art for a fencing system that can be used to confine a climbing animal, where the fencing system is low cost, easy to install and does not block the view of what lay beyond the fence. This need is met by the present invention as described and claimed below.

SUMMARY OF THE INVENTION

The present invention is a fencing system for confining climbing animals, such as cats. The fencing system uses a plurality of vertical posts that are set in place along a desired fence line. Arch support brackets are provided that attach to the vertical posts. Each arch support bracket has an ascending section that climbs to an apex point and a descending section that descends from that apex point. The vertical posts and the arch support brackets create the rigid supports for the fencing system.

Flexible netting is suspended between the rigid supports that are created by the vertical posts and the arch support brackets. The flexible netting is supported vertically by the vertical posts. Above the vertical posts, the flexible netting is supported in an ascending angle to an apex point by each ascending section of the arch support brackets. From the apex point, the flexible netting is supported in a descending angle at the free end of the arch support bracket by the descending section.

The result is a fence system that cannot be climbed by a pet, yet is nearly transparent. Furthermore, the fence system is inexpensive and easy to install.

BRIEF DESCRIPTION OF THE DRAWINGS

For a better understanding of the present invention, reference is made to the following description of exemplary embodiments thereof, considered in conjunction with the accompanying drawings, in which.

DETAILED DESCRIPTION OF THE DRAWINGS

Although the present invention fence system can be used to confine any non-flying household pet, such as a dog, it is particularly designed to confine climbing pets, such as cats. Accordingly, when describing the purpose of design for the present invention fence system, it will be described as being used to confine a cat. This is done to present the best mode of use anticipated for the invention.

Figure 1:
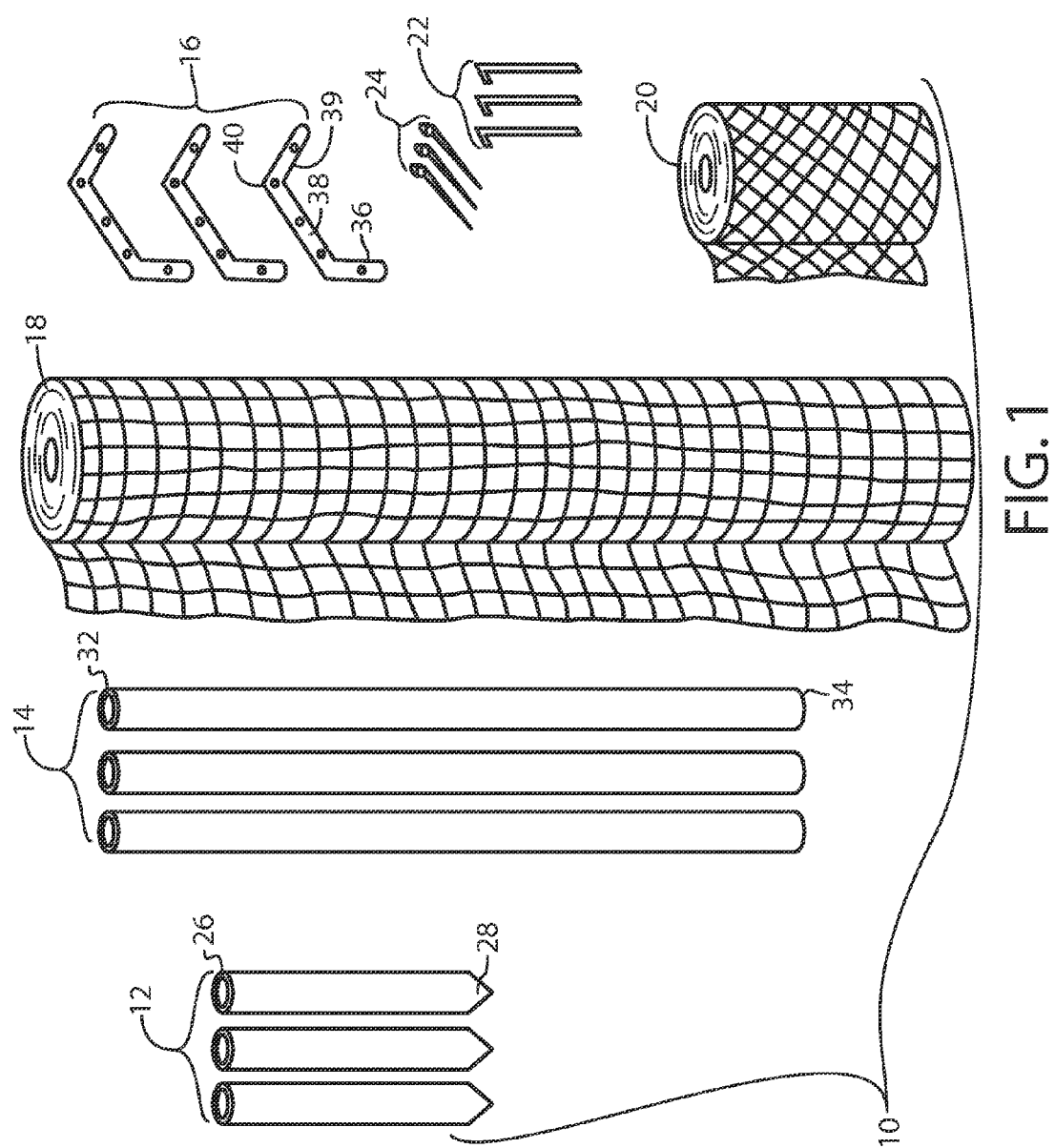
FIG. 1 is a perspective view of a sampling of the components that create one embodiment of the present invention fence system.

Referring to FIG. 1, there is shown a sampling of the components that are the present invention fence system 10. The number of components used in the fence system 10 is directly proportional to the length of the fence to be erected. Included within the fence system 10 are a plurality of ground anchor sleeves 12, vertical posts 14, arch support brackets 16, flexible plastic netting 18, metal guard mesh 20, stakes 22 and cable ties 24. The purpose and assembly of these components is described below.

Figure 2:
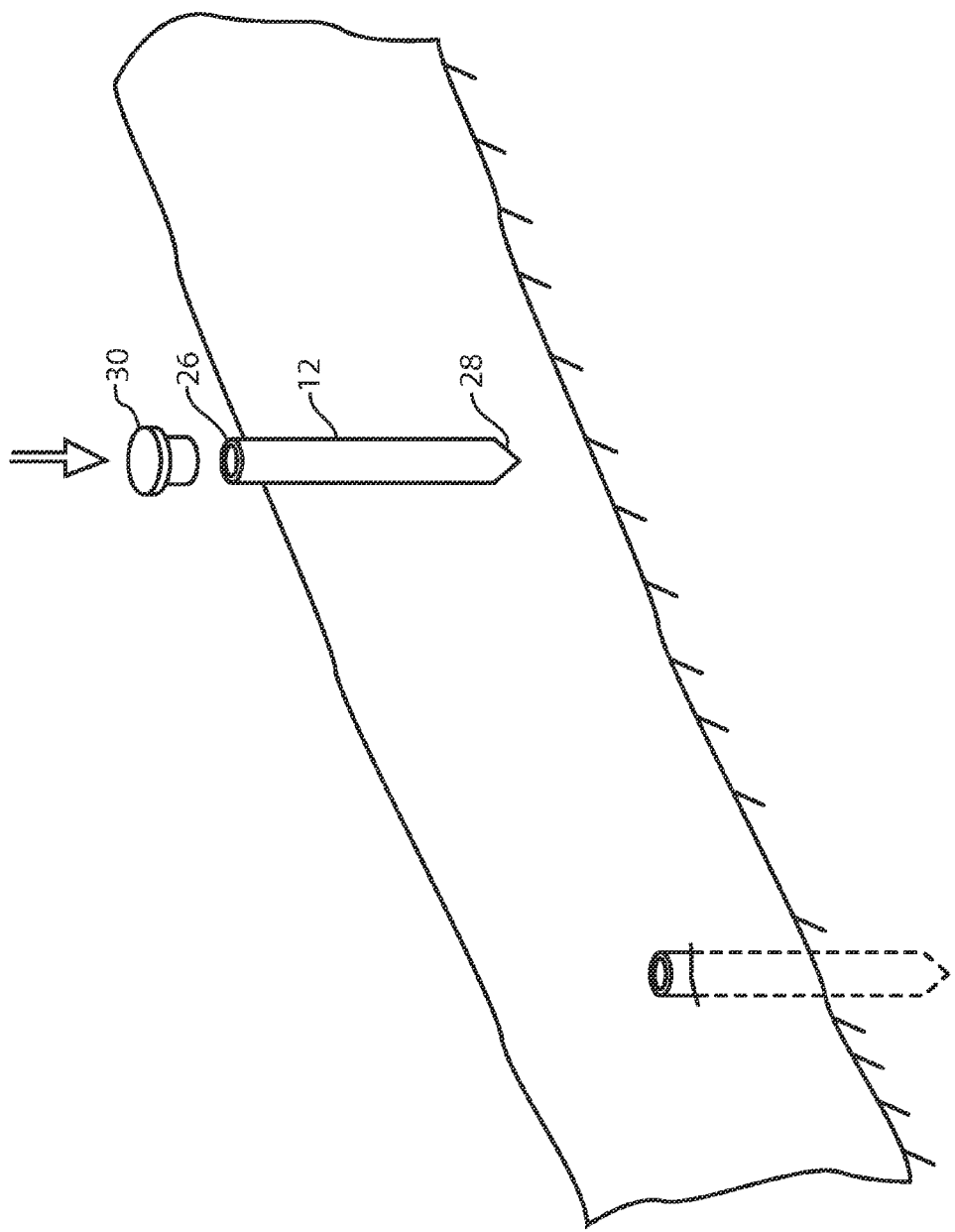
FIG. 2 is a perspective view of a first method step in the installation of the present invention fencing system.

To utilize the fence system 10, a person must first lay out the periphery of where the fence is to be constructed. At the corners of that fence layout and at various points along the fence layout, a person drives ground anchor sleeves 12 into the ground. Referring to FIG. 2 in conjunction with FIG. 1, it can be seen that the ground anchor sleeves 12 are tubular structures having one open end 26 and one closed end 28. The closed end 28 is pointed to help the ground anchor sleeve 12 be driven into the ground. The length of the ground anchor sleeve 12 can vary depending on the height of the fence being erected and the ground type. Preferably, the ground anchor sleeves 12 are between ten inches and thirty inches in length.

The ground anchor sleeves 12 are driven into the ground at periodic points along the length of the fence line. A ground anchor sleeve 12 is driven into the ground at all corners of the fence line and at evenly spaced intervals in between those corners. The space in between adjacent ground anchor sleeves 12 is preferably between eight feet and sixteen feet. A cap element 30 can be provided that fits over the open end 26 of the ground anchor sleeve 12. The cap element 30 protects the open end 26 from being damaged when the ground anchor sleeve 12 is driven into the ground by a sledgehammer.

Figure 3:
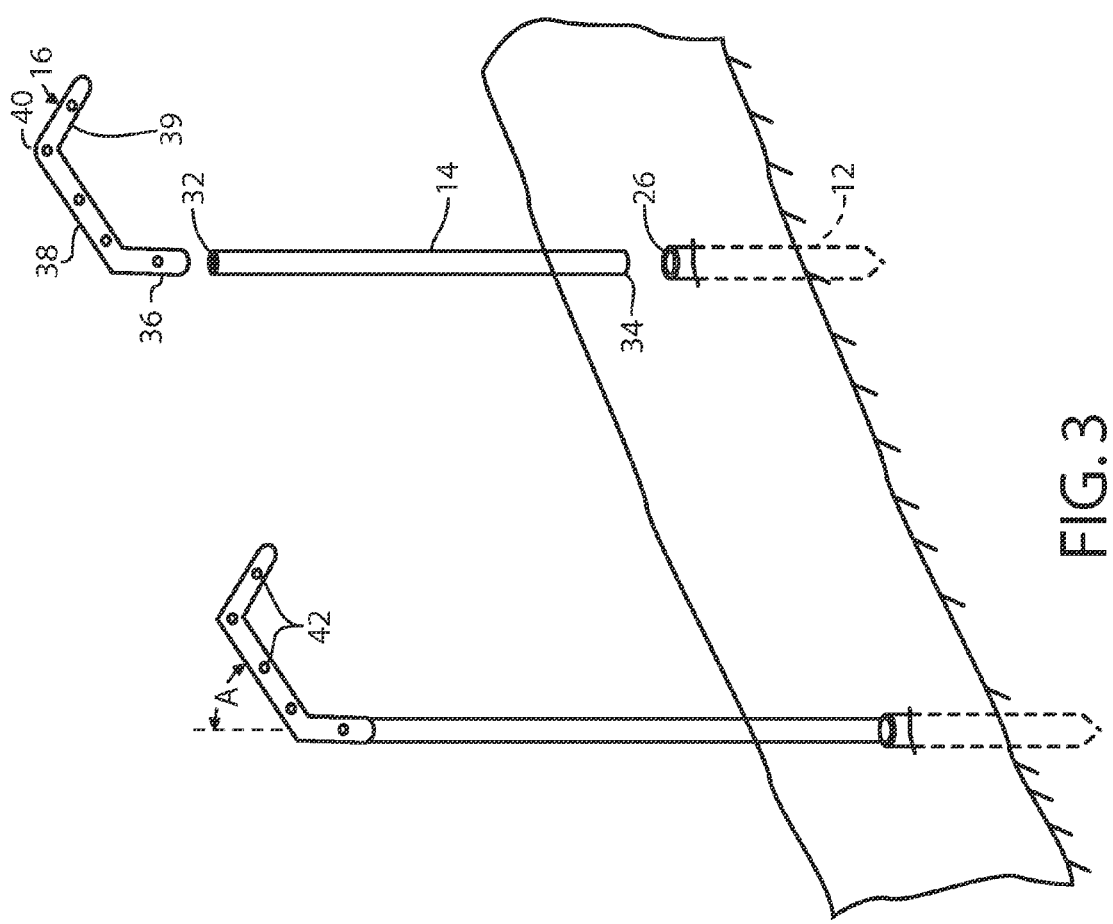
FIG. 3 is a perspective view of a second method step in the installation of the present invention fencing system.

Referring to FIG. 3, in conjunction with FIG. 1, it can be seen that after the ground anchor sleeves 12 are driven into the ground, the vertical posts 14 are set into the open end 26 of the ground anchor sleeves 12. The vertical posts 14 are supported in the vertical plane by the ground anchor sleeves 12. The vertical posts 14 extend above the ground anchor sleeves 12 by a height of between two feet and eight feet, with the preferred height being between three feet and seven feet.

Each vertical post has a top end 32 and a bottom end 34. The bottom ends 34 of the vertical posts 14 are received by the ground anchor sleeves 12. The top end 32 of each vertical post 14 can be either open or closed. Each of the arch support brackets 16 has a stem section 36 that passes around the top end 32 of a vertical post 14. A set screw is present in the stem section 36 so the arch support bracket 16 can be locked in place atop the vertical posts 14. It will therefore be understood that the arch support brackets 16 are separate elements from the vertical posts 14 and can be selectively added or removed from the vertical posts 14.

The arch support brackets 16 extend above the vertical posts 14. Each arch support bracket 16 has an ascending section 38 and a descending section 39. The ascending section 38 extends upwardly to an apex point 40 from the stem section 36. The ascending section 38 creates an angle A with the vertical plane of between thirty degrees and sixty degrees.

The descending section 39 extends downwardly from the apex point 40 of the ascending section 38 at close to a right angle. The descending section 39 preferably has a length of no more than half the length of the ascending section 38. Mounts 42, in the form of holes or clips, are optionally formed along the length of both the ascending section 38 and the descending section 39. These mounts 42 are used to connect the flexible netting 18 to the arch support brackets 16 as will later be explained.

Figure 4:
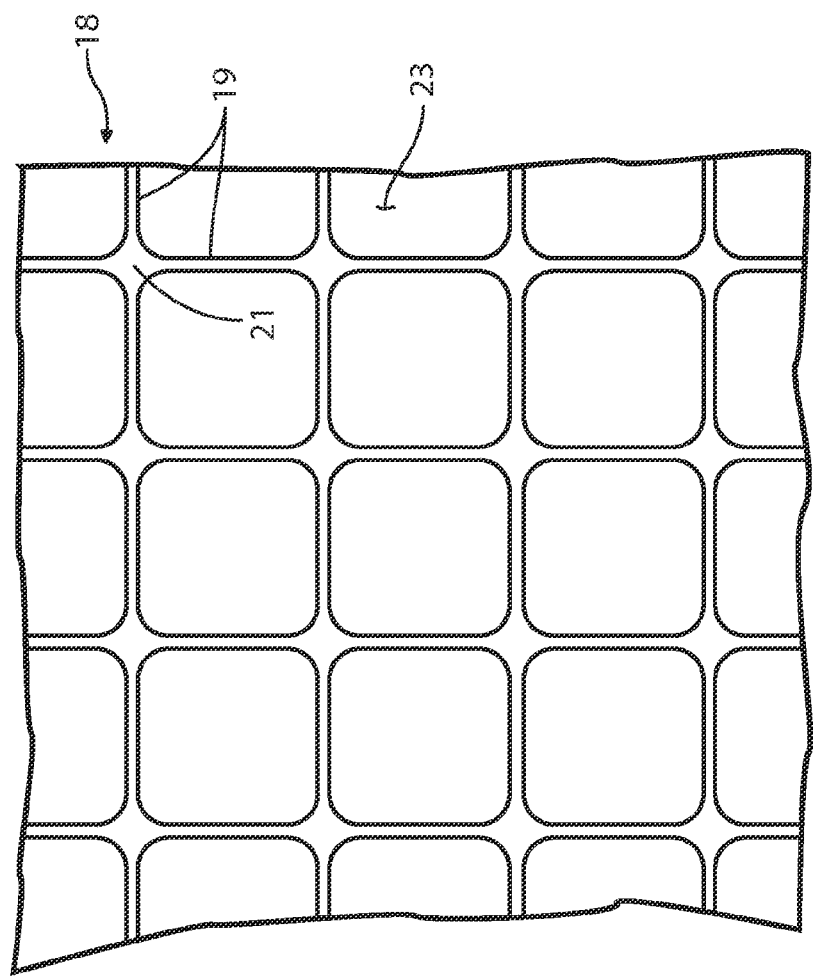
FIG. 4 is a fragmented view of a segment of flexible plastic netting used by the present invention.

Referring to FIG. 4, it can be seen that the flexible netting 18 is a plastic netting comprised of extruded plastic filaments 19. The plastic filaments are laid out in crisscrossing patterns. The plastic filaments 19 are heat bonded together at intersection points 21, therein creating the plastic netting 18. The plastic filaments 19 of the flexible netting 18 intersect at right angles and create netting with square or diamond shaped net openings 23. The net openings 23 defined by the intersecting plastic filaments 19 are preferably between one inch square and three inches square.

The plastic used in the creation of the flexible netting 18 is preferably either black or dark green. Accordingly, when the flexible netting 18 is suspended, the actual material of the flexible netting 18 is difficult to see. The flexible netting 18 therefore appears to be absent because of its dark coloring and the large disparity between the net openings 23 of the flexible netting 18 and the small diameter plastic filaments 19 that define those net openings. Accordingly, the structure of the fence provides very little visual obstruction to objects behind the fence.

In addition to being a dark color, the plastic used to create plastic netting 18 is preferably a plastic polymer such poly vinyl chloride that is highly resistant to weathering and UV light damage. In this manner, the plastic netting 18 can remain outdoors without rotting, breaking or otherwise degrading.

The plastic nature of the flexible netting 18 is also important in that it will not be eaten by deer, rabbits of other animals.

Figure 5:
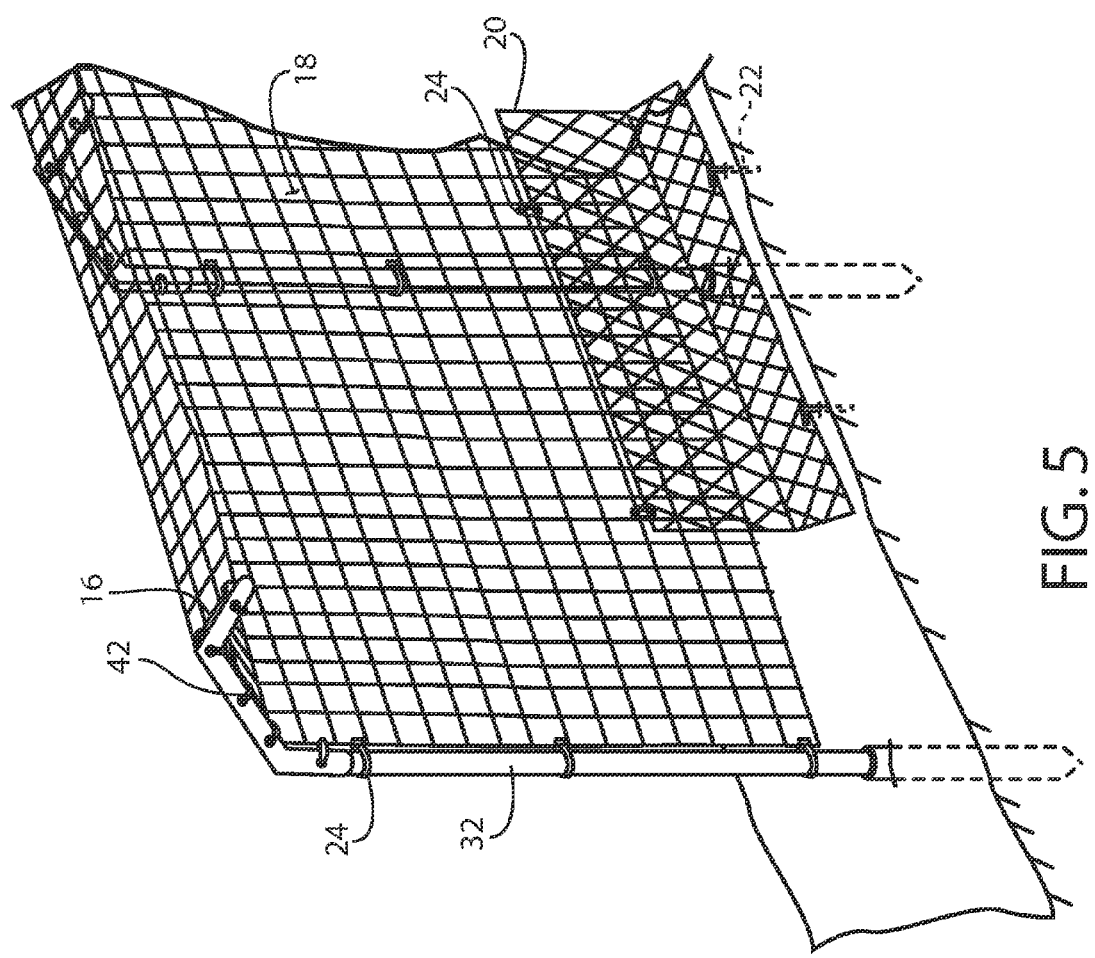
FIG. 5 is a perspective view of a third method step in the installation of the present invention fencing system.

Referring to FIG. 1 in conjunction with FIG. 5, it can be seen that the vertical posts 14 and the arch support brackets 16 form the supports of the fence. The flexible plastic netting 18 is rolled across the vertical posts 14 and the arch support brackets 16. The flexible plastic netting 18 is attached to the vertical posts 14 and the arch support brackets 16 with the use of common cable ties 24. The cable ties 24 wrap around the vertical posts 14 and the arch support brackets 16 and pass through the mesh of the flexible plastic netting 18. The cable ties 24 can be advanced through mounts 42 present on the arch support brackets 16 to ensure the cable ties 24 do not move out of place. The use of cable ties 24 is only exemplary and it will be understood that other kinds of binding connectors, such as wrapped wire, tape or string ties can also be used.

The flexible netting 18 is stretched across the eight to sixteen feet gaps in between vertical posts 14 and arch support brackets 16. Due to the flexibility of the plastic netting 18 it droops substantially as it spans across the arch support brackets 16. The flexible plastic netting 18 is therefore relaxed and is not pulled taut and straight at any point in between the arch support brackets 16.

Since the flexible plastic netting 18 is only made of plastic, it is possible that an animal can tear or gnaw through the flexible plastic netting 18 and create a hole in the flexible plastic netting 18. It is also easy for the flexible plastic netting to be accidentally broken if snagged by a chair of passing lawnmower. To help reinforce the flexible plastic netting 18, a roll of metal guard mesh 20 is provided. The metal guard mesh 20 is a metal mesh that is coated in vinyl or another protective coating. The protective coating on the metal guard mesh 20 is preferably the same dark color as the flexible plastic netting 18. The metal guard mesh 20 is rolled along the fence, wherein the guard mesh 20 overlaps the bottom of the flexible plastic netting 18 by a few inches. Preferably, the metal guard mesh 20 extends between six inches and two feet above the level of the ground. The metal guard mesh 20 is also bent so that it runs along the ground in front of the flexible netting 18. The guard mesh 20 is anchored to the ground with the ground stakes 22. The top edge of the guard mesh 20 is attached to the vertical posts 14 and to the flexible netting 18 with cable ties 24 or similar binding connectors. The presence of the guard mesh 20 prevents animals from gnawing or ripping the bottom of the flexible plastic netting 18 or digging under the flexible plastic netting 18.

Once fully assembled, the fence system 10 provides multiple deterrents to a climbing animal. First, the mesh of the flexible netting 18 is hard to see. Thus, it is an unsure target when leaped upon. Animals, such as cats, tend only to leap onto surfaces that they can clearly see. Furthermore, if a climbing animal were to climb up onto the flexible plastic netting 18, the animal would feel that the flexible plastic netting 18 is not rigid, but rather it would sag and sway with the weight of the animal. This would give a climbing animal the sense that they were about to fall, which would cause the animal to leap back to the ground.

Even if an animal did climb to the apex point 40 of the flexible plastic netting 18, the animal would have to climb downward and upside down to climb under and around the flexible netting 18 supported by the arch support bracket 16. It is far more likely that a determined climber would fall back to the ground than be able to successfully complete such a climbing maneuver.

Thus, the present invention fence system 10 provides a fence that is low cost, easy to install, inexpensive and visually unobtrusive. Yet the present invention fence system provides a formidable barrier to all climbing pets, such as cats.

In the present invention, ground anchor sleeves 12 are driven into the ground to support the vertical fence posts 14. However, in ground next to trees, the ground may be gnarled with roots that make the insertion of the ground anchor sleeves 12 difficult. Furthermore, a desired fence path may pass over a paved section of a person's backyard that is also poorly suited for the use of the ground anchor sleeves 12.

Figure 6:
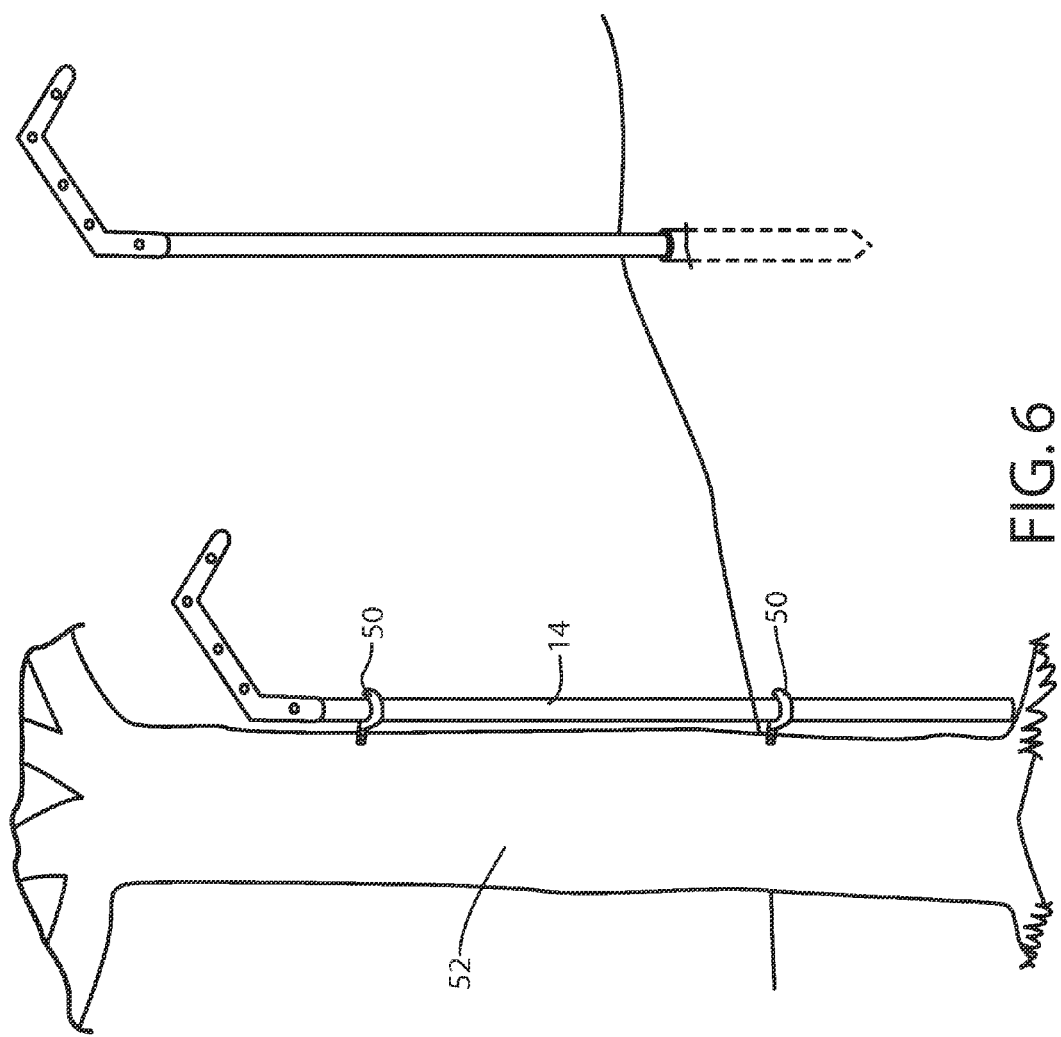
FIG. 6 is a side view of an alternate mounting system for the vertical posts of the present invention fencing system.

Referring to FIG. 6 an alternate mounting system is shown for the vertical fence posts 14 that can be used when the ground is unsuitable for a ground anchor sleeve. In the embodiment of FIG. 6, eyebolts 50 are set into a preexisting object 52. Although the shown preexisting object is a tree, it will be understood that the preexisting object can be another fence, a house wall, a clothesline pole or the like. The eyebolts 50 are set into the preexisting object 52 in a vertical alignment.

Once the eyebolts 50 are set into the preexisting object, a vertical post 14 is advanced through the eyebolts 50 and is locked into place with a cable ties. A arch support bracket 16 is then attached to the vertical post 14. The flexible plastic netting 18 and chew guard mesh 20 are then applied in the manner previously described.

It will be understood that the embodiments of the present invention fencing system illustrated and described are merely exemplary and that a person skilled in the art can make many variations and modifications to the shown elements. For example, in the shown embodiment, the arch support brackets have straight ascending arms and straight descending arms. Such a configuration can be replaced with a curved arch support bracket that has an ascending section and a descending section. Furthermore, there are many connector systems that can be used to interconnect the arch support bracket with the vertical post and the vertical post with the ground anchor sleeve. All such variations, modifications and alternate embodiments are intended to be included within the scope of the present invention as claimed.

What is claimed is:

1. A method of erecting a fence for confining climbing animals, said method comprising:
providing a plurality of vertical posts, each vertical post having a top end and a bottom end;
erecting said plurality of vertical posts along a periphery of an area to be fenced;
attaching a plurality of arch support brackets to said vertical posts, each of said arch support brackets having a first end, a second end and an apex point deposed between said first end and said second end, wherein an ascending section exists between said first end and said apex point, and a descending section exists between said apex point and said second end;
attaching a continuous section of flexible plastic netting to said vertical posts, and said arch support brackets, wherein said flexible plastic netting is supported vertically by said vertical posts, wherein said flexible netting is supported in an ascending angle to said apex point by each said ascending section of said arch support brackets, and wherein said flexible netting is supported in a descending angle from said apex point to said second end by each said descending section of said arch support brackets; and
attaching a section of metal mesh to said vertical posts from said bottom end, wherein said protective mesh overlaps a portion of said flexible plastic netting.

2. The method according to claim 1, wherein said flexible plastic netting is a dark color and said metal mesh has a finish coating that matches said dark color of said flexible plastic netting.

3. The method according to claim 1, further including metal spikes for anchoring said metal mesh to the ground.

4. The method according to claim 1, wherein said first end of said arch support brackets selectively interconnect with said top end of said vertical posts, whereby said arch support brackets are supported above said vertical posts.

5. The method according to claim 1, wherein said ascending section and said descending section of each arch support bracket are both straight.

6. The method according to claim 5, wherein said ascending section and said descending section of each arch support bracket intersect at said apex point at a perpendicular angle.

7. The method according to claim 1, wherein said flexible plastic netting defines net openings of at least one square inch.

8. The method according to claim 1, further including mounting elements that engage said vertical posts and support said vertical posts in a vertical orientation.

9. The method according to claim 8, wherein said mounting elements are ground anchor sleeves that are selectively driven into the ground, wherein said ground anchor sleeves receive said vertical posts and support said vertical posts in said vertical orientation.

10. The method according to claim 8, wherein said mounting elements are eyebolts that are set into an existing object, wherein said eyebolts receive said vertical posts therethrough and support said vertical posts in said vertical orientation.

11. The method according to claim 1, further including ties for selectively binding said flexible plastic netting to said vertical posts and said arch support brackets.

12. A method of constructing a fence, comprising the steps of:
erecting a plurality of supports along a periphery to be fenced, wherein each of said supports has a vertical section, an ascending section that extends at an angle above said vertical section to an apex point, and a descending section that extends downwardly from said apex point to a free end;
providing flexible plastic netting;
providing metal mesh;
attaching a continuous section of said flexible plastic netting to each said vertical section, said ascending section and said descending section of said supports, wherein said flexible plastic netting is supported vertically by each said vertical section of said supports, said flexible plastic netting is supported in an ascending angle to said apex point by each said ascending section of said supports, and said flexible plastic netting is supported in a descending angle from said apex point to said free end of said supports by each said descending section of said supports; and attaching a section of said metal mesh to each said vertical section wherein said metal mesh overlaps a portion of said flexible plastic netting.

13. The method according to claim 12, wherein said step of erecting a plurality of supports includes the substeps of:

erecting a plurality of vertical posts; and attaching an arch support bracket to each of said posts, wherein each said arch support bracket embodies said ascending section and said descending section of each said support.

14. The method according to claim 13, wherein said substep of erecting a plurality of vertical posts includes driving ground anchor sleeves into the ground and inserting a vertical post into each ground anchor sleeve.

15. The method according to claim 13, wherein said substep of erecting a plurality of vertical posts includes attaching eyebolts to an existing object and inserting said vertical posts through said eyebolts.

16. The method according to claim 12, wherein said step of attaching a section of metal mesh includes placing said metal mesh between said supports proximate the ground and bending a portion of said metal mesh lay over the ground.

17. The method according to claim 12, wherein said flexible plastic netting is comprised of intersecting strands that define net openings having an area of at least one square inch.

\* \* \* \* \*